US012596786B2

(12) United States Patent
Jasper et al.

(10) Patent No.: US 12,596,786 B2
(45) Date of Patent: Apr. 7, 2026

(54) ANOMALOUS EVENT AGGREGATION FOR ANALYSIS AND SYSTEM RESPONSE

(71) Applicant: Rockwell Automation Technologies, Inc., Mayfield Heights, OH (US)

(72) Inventors: Taryl J. Jasper, Concord Township, OH (US); Jack M. Visoky, Willoughby, OH (US); Ankur Mohan, Jersey City, NJ (US); David E. Huffman, Lake Mills, WI (US); Donald P. McCoy, Stow, OH (US); David D. Brandt, New Berlin, WI (US)

(73) Assignee: Rockwell Automation, Inc., Mayfield Heights, OH (US)

( * ) Notice: Subject to any disclaimer, the term of this patent is extended or adjusted under 35 U.S.C. 154(b) by 276 days.

(21) Appl. No.: 18/318,468

(22) Filed: May 16, 2023

(65) Prior Publication Data

US 2024/0160720 A1     May 16, 2024

Related U.S. Application Data

(60) Provisional application No. 63/383,355, filed on Nov. 11, 2022.

(51) Int. Cl.
*G06F 21/00*     (2013.01)
*G06F 21/52*     (2013.01)

(52) U.S. Cl.
CPC .................................. *G06F 21/52* (2013.01)

(58) Field of Classification Search
CPC ...... G06F 21/52; G06F 21/554; G06F 21/552; G05B 19/05; G05B 23/0259;
(Continued)

(56) References Cited

U.S. PATENT DOCUMENTS

2016/0301709 A1* 10/2016 Hassanzadeh ...... H04L 63/1425
2017/0214717 A1* 7/2017 Bush .................. G05B 19/4185
(Continued)

OTHER PUBLICATIONS

Extended European Search Report in EP23209038.1, mailed Mar. 27, 2024, 9 pages.

*Primary Examiner* — Michael M Lee

(57)     ABSTRACT

Technology disclosed herein describes a system and method for aggregating event information in an industrial automation system for analysis and response. In an implementation, industrial automation devices perform industrial automation processes in an industrial automation environment. A computing device receives event data relating to events that occurred on an associated industrial automation device of the industrial automation devices. The computing device normalizes the event data to generate normalized event data which describes the events. The computing device supplements the normalized event data with context information relevant to the associated industrial automation device to generate complete event data. The computing device identifies an anomaly for an industrial automation device of the industrial automation devices based on analyzing the complete event data associated with the industrial automation device. In response to identifying an anomaly, the computing device performs an action to mitigate damage from the anomaly.

20 Claims, 5 Drawing Sheets

200

RECEIVE EVENT DATA FOR INDUSTRIAL DEVICE OF IAP
201

NORMALIZE EVENT DATA TO GENERATE NORMALIZED DATA
203

SUPPLEMENT NORMALIZED EVENT DATA WITH CONTEXT INFORMATION TO GENERATE COMPLETE EVENT DATA
205

IDENTIFY ANOMALY BASED ON COMPLETE EVENT DATA
207

PERFORM AN ACTION TO MITIGATE DAMAGE IN RESPONSE TO IDENTIFYING ANOMALY
209

(58) Field of Classification Search
CPC . G05B 23/024; G05B 23/0221; H04W 12/63;
G06N 20/00; H04L 63/107; H04L
63/1425
See application file for complete search history.

(56)                    References Cited

U.S. PATENT DOCUMENTS

| 2017/0230410 | A1  |  8/2017 | Hassanzadeh et al. |
| 2018/0013785 | A1* |  1/2018 | Satish | H04L 63/1425 |
| 2018/0316727 | A1* | 11/2018 | Tsironis | H04L 63/0263 |
| 2019/0207969 | A1* |  7/2019 | Brown | G06F 21/552 |
| 2019/0317465 | A1* | 10/2019 | Wei | G06F 21/577 |
| 2020/0136889 | A1* |  4/2020 | Chen | H04L 67/535 |
| 2020/0344211 | A1* | 10/2020 | Katz | H04L 63/0236 |
| 2021/0096541 | A1* |  4/2021 | Sayyarrodsari | H04W 4/38 |
| 2021/0149384 | A1* |  5/2021 | Dittmer | H04L 43/16 |
| 2021/0273965 | A1* |  9/2021 | Pi | G06N 20/00 |
| 2022/0342988 | A1  | 10/2022 | Brunza et al. |

* cited by examiner

200

RECEIVE EVENT DATA FOR INDUSTRIAL DEVICE OF IAP
201

NORMALIZE EVENT DATA TO GENERATE NORMALIZED DATA
203

SUPPLEMENT NORMALIZED EVENT DATA WITH CONTEXT INFORMATION TO GENERATE COMPLETE EVENT DATA
205

IDENTIFY ANOMALY BASED ON COMPLETE EVENT DATA
207

PERFORM AN ACTION TO MITIGATE DAMAGE IN RESPONSE TO IDENTIFYING ANOMALY
209

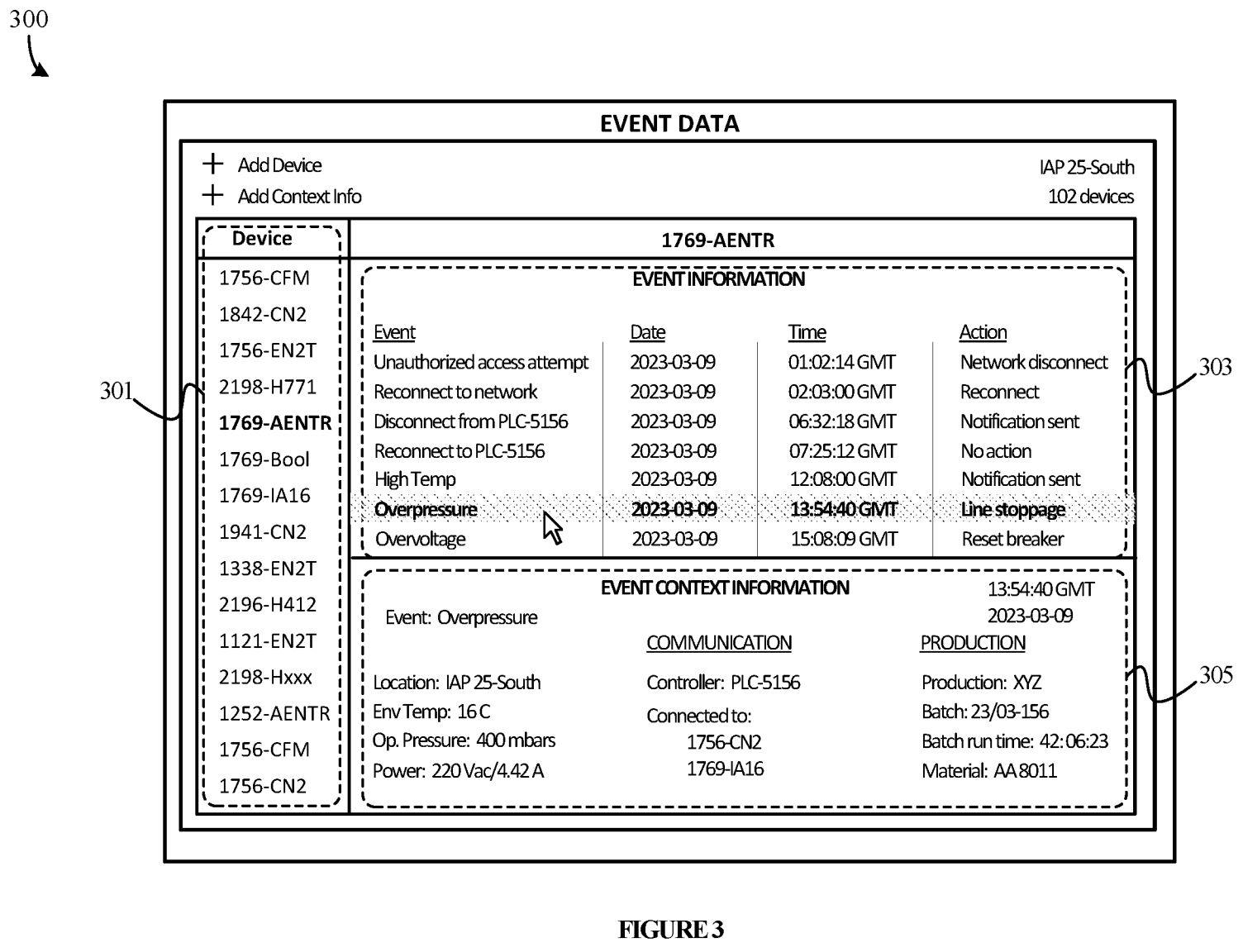

300

301

303

305

EVENT DATA

IAP 25-South
102 devices

+ Add Device
+ Add Context Info

Device

1756-CFM
1842-CN2
1756-EN2T
2198-H771
1769-AENTR
1769-Bool
1769-IA16
1941-CN2
1338-EN2T
2196-H412
1121-EN2T
2198-Hxxx
1252-AENTR
1756-CFM
1756-CN2

1769-AENTR

EVENT INFORMATION

| Event | Date | Time | Action |
|---|---|---|---|
| Unauthorized access attempt | 2023-03-09 | 01:02:14 GMT | Network disconnect |
| Reconnect to network | 2023-03-09 | 02:03:00 GMT | Reconnect |
| Disconnect from PLC-5156 | 2023-03-09 | 06:32:18 GMT | Notification sent |
| Reconnect to PLC-5156 | 2023-03-09 | 07:25:12 GMT | No action |
| High Temp | 2023-03-09 | 12:08:00 GMT | Notification sent |
| Overpressure | 2023-03-09 | 13:54:40 GMT | Line stoppage |
| Overvoltage | 2023-03-09 | 15:08:09 GMT | Reset breaker |

EVENT CONTEXT INFORMATION

Event: Overpressure

COMMUNICATION

Location: IAP 25-South
Env Temp: 16C
Op. Pressure: 400 mbars
Power: 220 Vac/4.42 A Controller: PLC-5156
Connected to:
    1756-CN2
    1769-IA16

13:54:40 GMT
2023-03-09

PRODUCTION

Production: XYZ
Batch: 23/03-156
Batch run time: 42:06:23
Material: AA 8011

FIGURE 3

COMPUTING SYSTEM 501

STORAGE SYSTEM 503

SOFTWARE 505

EVENT DATA PROCESS 506

COMM I/F SYSTEM 507

PROCESSING SYSTEM 502

USER I/F SYSTEM 509

500

ANOMALOUS EVENT AGGREGATION FOR ANALYSIS AND SYSTEM RESPONSE

RELATED APPLICATIONS

This application is related to and claims the benefit of priority to U.S. Provisional Patent Application No. 63/383,355, entitled SECURITY EVENT AGGREGATION SYSTEM AND METHOD, and filed on Nov. 11, 2022, the contents of which are hereby incorporated by reference in their entirety.

TECHNICAL FIELD

This disclosure generally relates to a system and method for aggregating security event information from various sources in an industrial automation system and transforming the aggregated information into a single stream of information for analysis by an analytics engine.

BACKGROUND

Industrial automation processes involve multiple inter-connected and inter-operational devices and machinery that perform many manufacturing functions such as raw material handling, fabrication tasks, quality control testing, and packaging. The various devices of an automation process are connected to and controlled by controllers, such as programmable logic controllers (PLCs). The interconnection of devices and controllers form a control plane of the automation process which operates on a communication network such as a wireless network or Ethernet network.

Given the complexity of operations of an industrial automation environment, which may span multiple industrial plants as well as multiple operations or processes within each plant, remote monitoring of industrial operations is facilitated by network access to the control plane of the industrial automation environment. Network access to the control plane allows organizational personnel to remotely access (e.g., monitor or control) the operations of a plant. This broad-based or distributed access to plant operations across an organizational hierarchy lends itself to improved efficiency in allowing quick response to and resolution of security issues that might arise; enhanced safety in detecting potential hazards more quickly; cost savings in reducing the number of personnel needed to operate a plant; increased uptime by identifying potential equipment failures before they occur; and data analysis based on the large amounts of operational data that can be collected and analyzed to better understand plant operations.

However, network access to plant operations may be vulnerable to the risk of intrusion by bad actors, such as hacking, malware, or ransomware attacks. While these threats can compromise the safety and security of the plant's operations and data, such as by disrupting operations leading to lost productivity, the risks also include more serious dangers, such as damage or destruction of equipment or facilities and injury to on-site personnel.

SUMMARY

The present application provides a system and method for aggregating event information in an industrial automation system for analysis and system response. In an implementation, industrial automation devices perform industrial automation processes in an industrial automation environment. A computing device receives event data describing events that occurred on an associated industrial automation device of the industrial automation devices. The computing device normalizes the event data. The computing device supplements the event data, either before or after normalization, with context information relevant to the associated industrial automation device for the events to generate complete event data. The computing device identifies a security event for an industrial automation device based on analyzing the complete event data associated with the industrial automation device using deterministic algorithms and/or artificial intelligence algorithms. In response to identifying an anomaly, the computing device performs an action to mitigate damage from the security event.

According to some aspects of the disclosure, the events may be cybersecurity events, and the anomaly includes a security threat. In some implementations of the disclosed technology, the context information includes data describing a logical hierarchy of the industrial automation devices based on an asset model of the industrial automation environment and/or a physical location of the industrial automation devices. In the same or other implementations, the context information includes data describing the raw materials and/or batch information used by the associated industrial automation device. In some implementations, the action taken to mitigate damage may include modifying the mode of the industrial automation device to a disconnected mode, neutralizing the anomaly to prevent damage to the equipment, or placing the industrial automation system in a safe state.

BRIEF DESCRIPTION OF THE DRAWINGS

These and other features, aspects, and advantages of the present disclosure may become better understood when the following detailed description is read with reference to the accompanying drawings in which like characters represent like parts throughout the drawings, wherein:

FIG. 3 illustrates a user interface for an event data aggregation system for an industrial automation environment in an implementation.

DETAILED DESCRIPTION

Figure 1:
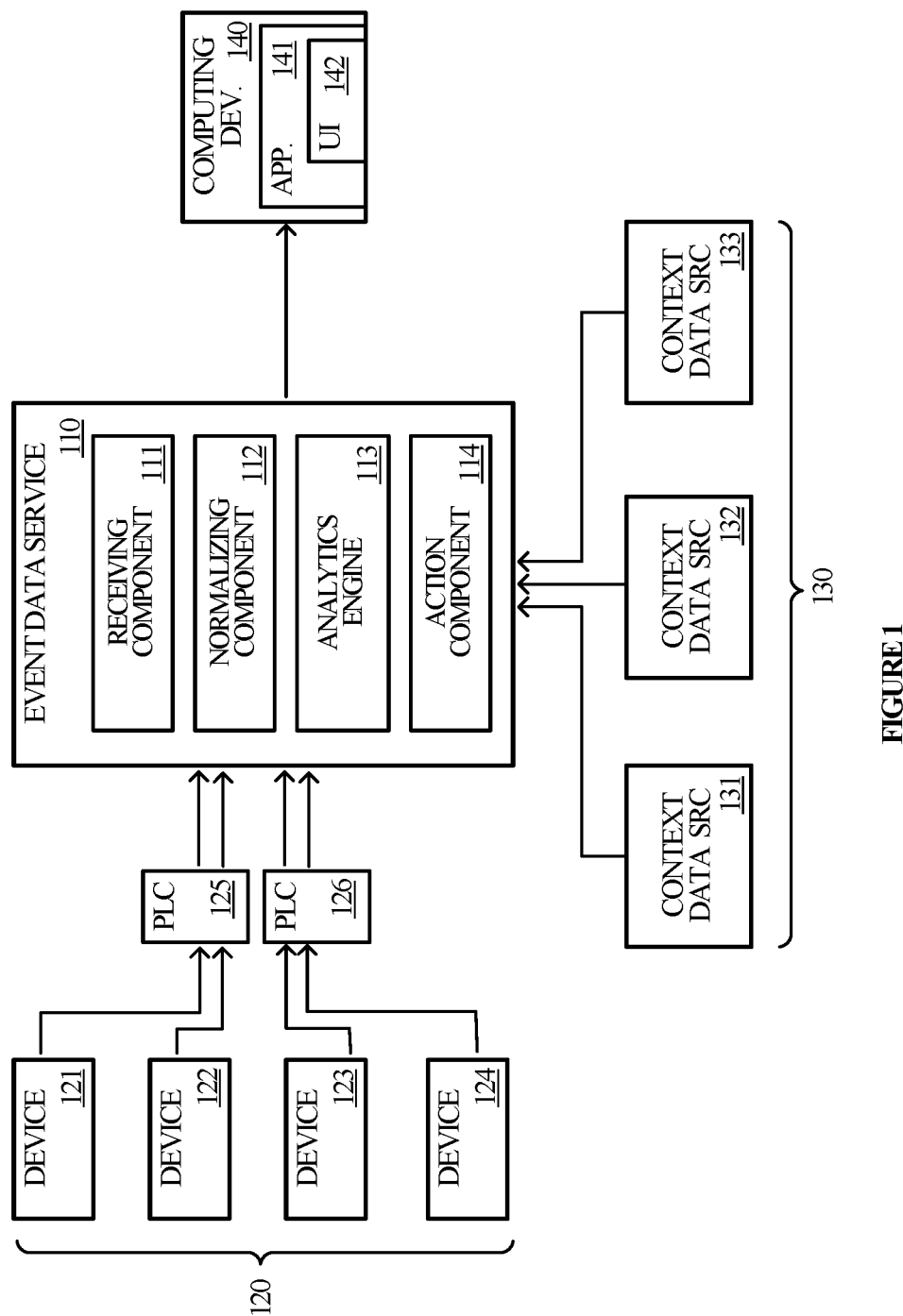
FIG. 1 illustrates an operational architecture for an event data aggregation system for an industrial automation environment in an implementation.

One or more specific embodiments are described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present application provides a system and method for aggregating event information for analysis and response. Event information can include information relating to security events, cybersecurity events, or operational anomalies, in an industrial automation system. In an implementation, the industrial automation system includes one or more industrial automation devices. An event data service of the industrial automation process harvests event information from various sources of an industrial automation process, such as event information received from the industrial automation devices or from control plane devices of the industrial automation process. The event data service normalizes the information from the various sources for consumption by an analytics engine. Because the data received from the various sources may be in different formats according to the source, the service transforms the data streams into a common message format that can be consumed by an analytics engine. For example, the incoming data may be processed to produce a SysLog-formatted output for analysis by the analytics engine.

The event data service also collects contextual information relating to the industrial devices and integrates the contextual information with the event information or normalized data to generate a complete event dataset. The complete event dataset may be used for further analysis and action, such as determining a cybersecurity risk, for forensics or security debugging, etc. In various implementations, the complete event dataset may be analyzed to identify patterns associated with anomalous behavior. The complete dataset may also be analyzed by an artificial intelligence (AI) or deep learning model trained on anomalous event data, such as cybersecurity event data, to identify anomalous events. If anomalous events are not timely detected, this can lead to damage to an industrial automation environment such as loss of communication to the industrial automation device, reprogramming of the industrial automation device, production rate losses, proprietary information leakage, product quality loss to products created by the industrial automation process, and efficiency losses.

In various implementations, the context data received by the event data service includes information relating to the logical or operational organization of devices within a plant or process including the organization of devices relative to a particular device. For example, the context data may include an asset model describing the hierarchy and device connections of the industrial automation environment, including in the context of or relative to a particular device. Context data may also include parameters which identify devices with which a particular device interacts (e.g., pre- or post-processing relative to the operation of the subject device) or communicates. Context data may also include equipment or devices in the control plane hierarchy of the industrial automation environment or process, such as industrial controllers (e.g., PLCs) and the devices which they control. Context data may also include computing devices by which users monitor and control the operation of devices via a network connection, such as human-machine interface devices (HMIs) or computing devices executing control system logic. Context data may also include communication logs of interactions with devices by other devices, personnel, or others.

Context data may also include the physical locations of the industrial automation devices, such as the physical plant or geographic location of the plant, an area or sector of operations within the plant, and automation process or line within the plant. Context data may also include data relating to a security perimeter to the device, such as locked or alarmed doors near the device, along with records of or data relating to access to the area of the device, such as a log of keycard use by authorized personnel or others or information relating to the physical proximity of a user or plant personnel to a particular device. Context data may also include operational information or parameters such as operating temperatures, pressures, or other characteristics. Context data may also include power data relating to the operation of the device as well as data relating to power control modules (PCMs), intelligent electrical devices (IEDs), circuit breakers, and other electrical devices associated with a particular device. Context data may also include authorization or access control data, such as personnel or devices authorized to access, monitor, or control the subject device. Context data may also include environmental data of the plant or area of the plant in which a subject device operates, such as ambient temperature or humidity.

Context data may also include information relating to the operation of a particular device, such as the raw materials which the device handles or processes and batch data. Context data may also include the days and times when the device was in operation or the modes of operation of the device on various days or at various times. Context data may also include data relating to the operation of devices with which a particular device interacts, such as authorized communication between devices.

Having identified an anomaly, such as atypical operation of an industrial automation device or an attempted access of the automation environment by an unauthorized user or device, the event data service can implement an action based on the identified anomaly to prevent or mitigate damage to associated devices. Such actions can include initiating an automatic shutdown of an affected device, putting the system into a safe state, disconnecting the device from network access, and reconfiguring an access control or communication policy of the device, for example, to silo the device.

The present application aims to normalize anomalous event information, including cybersecurity event information, from different sources so that the information is consumable by an analytics engine for further use by the industrial automation system. The anomalous event information from different sources is transformed into a common message format via a software layer that is configured to interface between the different data sources and the analytics engine.

The anomalous event information may be in different formats and any suitable data transformation method may be performed on the data from each source. Any suitable protocol and message format may be used for the normalized data. The message format may be a rich text data format, such that the generated message provides free-form text in addition to numerical values, with the free-form text providing at least some descriptive information regarding the cybersecurity event that occurred. The message may include other desired information, such as timestamps, etc. An example of a suitable format is SysLog, but many other formats may be suitable. The common format into which the source data is normalized may be dependent on the readability by the desired analytics engine.

The normalized data may be read or consumed by an analytics engine for any suitable analysis. In exemplary embodiments, a machine learning process may be applied to the normalized cybersecurity information to produce analytical data. The normalized data may be used to perform any suitable further processes in the industrial automation system. In exemplary embodiments, a cybersecurity risk may be determined using the normalized cybersecurity information. In still other exemplary embodiments, the normalized cybersecurity information may be used for forensics, e.g., to determine how a hacking event occurred in the system, or security debugging.

As shown in FIG. 1 (discussed in greater detail below), an industrial automation system has a number of sources of security event information, including industrial assets and network infrastructure devices. The security event information from the different sources may have different message formats such that harvesting the information may rely on different procedures and protocols. Thus, it is challenging for the information to be correlated, viewed, analyzed, etc. in a single location or tool. Conventionally, reviewing and analyzing the security events that have taken place includes using multiple tools and mechanisms, and manually correlating the events. The conventional process is tedious and prone to human error.

FIG. 1 is a block diagram of industrial automation environment 100, including industrial devices 120 which are representative of multiple diverse industrial devices and assets. Devices 120 communicate with event data service 110 via PLC 125 or PLC 126 through which event data service 110 receives device data from industrial devices 120 and context data from context data sources 130. Event data service 110 includes receiving component 111, normalizing component 112, analytics engine 113, and action component 114. Event data service 110 communicates with computing device 140 executing application 141 displaying user interface 142. Context data sources 130 are representative of devices which provide contextual information relating to various ones of industrial devices 120, including control plane devices, power management devices, sensors, data models (e.g., asset models), and computing devices receiving inputs such as log data, such as telemetry data relating to plant activity or environment conditions, and/or user input, such as input relating to device or industrial process operations.

Figure 5:
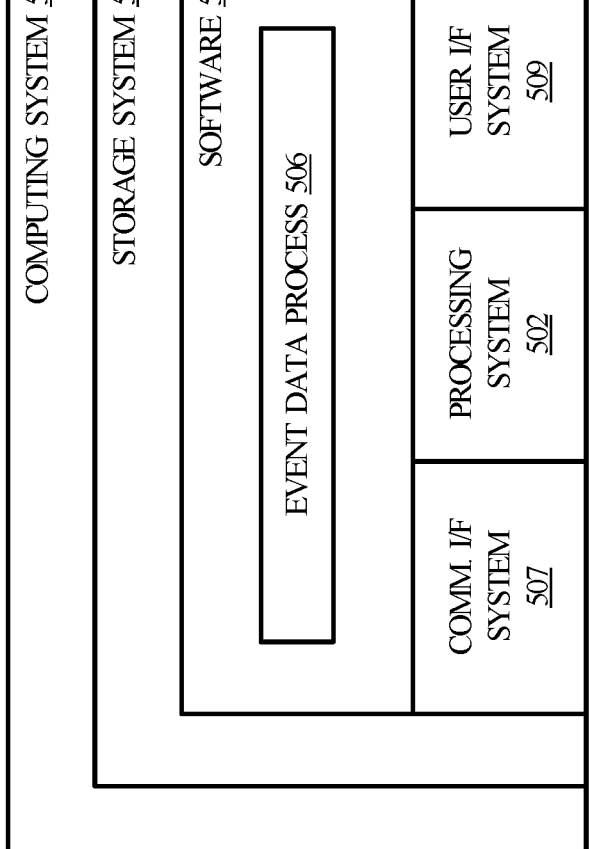
FIG. 5 illustrates a computing system suitable for implementing the various operational environments, architectures, processes, scenarios, and sequences discussed below with respect to the other Figures.

Event data service 110 is representative of one or more computing services capable of receiving device data, such as event data, from industrial devices 120 and context data from context data sources 130. Event data service 110 includes sub-services or processes, such as receiving component 111, normalizing component 112, analytics engine 113, and action component 114, by which to perform aspects of the technology disclosed here. Event data service 110 may be implemented in the context of one or more server computers which are capable of communicating with computing device 140 and with PLCs 125 and 126 and other control plane devices which control industrial devices 120. Examples of such server computers include web servers, application servers, virtual or physical (bare metal) servers, or any combination or variation thereof, of which computing device 501 in FIG. 5 is broadly representative. Event data service 110 may be hosted "in the cloud," whether it be an on-premises cloud, a third-party cloud, or a hybrid cloud distributed between on-prem and off-prem clouds. Event data service 110 may communicate with computing device 140 via one or more internets, intranets, the Internet, wired and wireless networks, local area networks (LANs), wide area networks (WANs), and any other type of network or combination thereof.

Event data service 110 includes receiving component 111, representative of one or more computing subservices capable of receiving event data from various ones of industrial devices 120 and transferring the data to normalizing component 112. Receiving component 111 may be implemented in hardware and/or software in the context of event data service 110 or other service of industrial automation environment 100.

Normalizing component 112 of event data service 110 is representative of one or more computing subservices capable of receiving event data from receiving component 111, normalizing the event data for further processing, and transferring the normalized data to analytics engine 113. Normalizing component 112 may be implemented in hardware and/or software in the context of event data service 110 or other service of industrial automation environment 100.

Analytics engine 113 of event data service 110 is representative of one or more computing subservices capable of receiving normalized data from normalizing component 112 and context data from various ones of context data sources 130, integrating the normalized data and the context data to generate a complete event dataset based on the normalized data and context data, identifying anomalies, suspected anomalies, or the potential for future anomalies in the complete event dataset, and initiating an action by action component 114 in response to identifying an anomaly. Analytics engine 113 may be implemented in hardware and/or software in the context of event data service 110 or other service of industrial automation environment 100.

Event data service 110 also includes action component 114, representative of one or more computing subservices capable of receiving a request for an action based on an anomaly detected by analytics engine 113 and initiating or performing the action. Action component 114 may be implemented in hardware and/or software in the context of event data service 110 or other service of industrial automation environment 100.

Industrial devices 120, including industrial devices 121-124, are representative of industrial machinery, equipment, or assets such as conveyor belts, robotic devices, packaging devices, processing equipment, mixers, filling stations, quality control devices, etc. Industrial devices 120 may include both input devices that provide data relating to the controlled industrial systems to industrial controllers, and output devices that respond to control signals generated by the industrial controllers to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like.

Other industrial devices or assets of industrial devices 120 can include industrial robots, which may operate in accordance with programs executed by their own internal controllers, in conjunction with information exchanged with one or more external controllers. Some industrial environments may also include a number of sub-systems that perform various production, quality, or safety functions, including but not limited to vision systems, safety systems (e.g., optical presence sensing systems, safety relay systems, etc.), product quality check systems (e.g., leak test systems), or other such assets.

PLCs 125 and 126 are representative of industrial controllers of an industrial plant environment which monitor and control respective industrial systems or processes relating to product manufacture, machining, motion control, batch processing, material handling, or other such industrial functions. PLCs 125 and 126 may execute respective control programs to facilitate monitoring and control of industrial devices 120 making up the controlled industrial systems. PLCs 125 and 126 may also comprise a soft controller executed on a personal computer or other hardware platform, or a hybrid device that combines controller functionality with other functions (e.g., visualization). The control programs executed by PLCs 125 and 126 can comprise any conceivable type of code used to process input signals read from industrial devices 120 and to control output signals generated by the industrial controllers, including but not limited to ladder logic, sequential function charts, function block diagrams, or structured text.

Context data sources 130, including context sources 131-133, are representative of devices which provide contextual information relating one or more of devices 120 to event data service 110. Context data sources 130 can also include industrial controllers, such as PLCs 125 and 126, which communicatively interface with industrial devices 120 over hardwired or networked connections. Industrial controllers can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.).

Context sources can also include power management devices, such as PCMs or IEDs, which receive data from electrical devices in an industrial automation process and pass the data to a PLC controlling the process. Power management devices may also receive instructions from the PLC and control the electrical devices based at least in part on the instructions. IEDs include circuit breakers which connect industrial assets to the electrical network of the plant, and which provide breaker control (e.g., opening or closing a breaker) as well as electrical metering data which may be accessible by remotely located control equipment or computing devices. IEDs may be stand-alone devices through which an asset connects to the electrical network, or they may be integrated into the devices.

Context data sources 130 can also include one or more human-machine interfaces (HMIs)—control-plane devices of an industrial automation environment which allow plant personnel to view telemetry and status data associated with the automation systems and to control some aspects of system operation. HMIs may communicate with one or more of the industrial controllers over a plant network, and exchange data with the industrial controllers to facilitate visualization of information relating to the controlled industrial processes on one or more pre-developed operator interface screens. HMIs can also be configured to allow operators to submit data to specified data tags or memory addresses of the industrial controllers, thereby providing a means for operators to issue commands to the controlled systems (e.g., cycle start commands, device actuation commands, etc.), to modify setpoint values, etc. HMIs can generate one or more display screens through which the operator interacts with the industrial controllers, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers by HMIs and presented on one or more of the display screens according to display formats chosen by the HMI developer.

Context data sources 130 may also include industrial devices or assets may include inventory tracking systems, work order management systems, or other such systems, some or all of which may reside on a communication network of the industrial environment (e.g., a separately managed network relative to the plant network). The industrial network environment may also include a number of network architecture devices, such as firewalls, hubs, routers, or switches, that connect separate networks and/or networked devices and manage data flow between the various devices and networks. In some industrial automation environments, context data sources 130 may also include one or more data historians which aggregate and store production information collected from the industrial controllers or other data sources, or a device documentation store containing electronic documentation for various ones of industrial devices 120 of the controlled industrial automation processes.

Computing device 140 is representative of computing devices, such as laptops or desktop computers, mobile computing devices, such as tablet computers or cellular phones, and any other suitable devices of which computing device 501 in FIG. 5 is broadly representative. Computing device 140 communicates with event data service 110 via one or more internets and intranets, the Internet, wired or wireless networks, local area networks (LANs), wide area networks (WANs), and any other type of network or combination thereof. A user interacting with computing device 140 interacts with event data service 110 via user interface 142 of the application 141 which may be hosted by event data service 110 or executing as natively installed application or web-based application on computing device 140. In an implementation, user interface 142 can configure aspects of event data service 110, including configuring settings for actions or notifications to be performed by action component 114 when an anomaly is detected. User interface 142 also displays complete event data generated by analytics engine 113 and includes user interface components that allow a user to navigate and drill into the complete event data, such as a hierarchical menu pane based on an associated asset model of industrial automation environment 100.

Event data service 110, industrial devices 120, PLCs 125 and 126, context data sources 130, and computing device 140 may communicate via over data links (not shown) communication technologies such as industrial ethernet, Institute of Electrical and Electronic Engineers (IEEE) 802.3 (ENET), IEEE 802.11 (WIFI), Bluetooth, Time Division Multiplex (TDM), Data Over Cable System Interface Specification (DOCSIS), Internet Protocol (IP), General Packet Radio Service Transfer Protocol (GTP), and/or some other type of wireline and/or wireless networking protocol. The data links comprise metallic links, glass fibers, radio channels, or some other communication media. The data links use ENET, WIFI, virtual switching, inter-processor communication, bus interfaces, and/or some other data communication protocols.

Event data service 110, industrial devices 120, PLCs 125 and 126, context data sources 130, and computing device 140 include microprocessors, software, memories, transceivers, bus circuitry, and the like. The microprocessors comprise Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of industrial automation environment 100 as described herein.

In operation, in an implementation, receiving component 111 receives event data produced by industrial devices 120 which may be relayed to receiving component 111 via one or more controllers such as PLC 125. The event data received by receiving component 111 may include, for example, operational data of device 122 such as an operational status (on, off, standby, offline, etc.) and parameters (speed, temperature, pressure, voltage, etc.). For example, the event data is transmitted to receiving component 111 in a SysLog format, an OPC Unified Architecture (OPC UA) format, a Modbus format, as a JavaScript Object Notation (JSON) data object, a Message Queuing Telemetry Transport (MQTT) message, and so on. Receiving component 111 transmits the event data to normalizing component 112 of event data service 110.

Continuing the exemplary scenario, normalizing component 112 receives event data from receiving component 111 and converts the event data into a normalized or standardized format. For example, normalizing component 112 may receive event data as a JSON data object and generate a SysLog message by mapping the fields of the JSON data object to corresponding fields of a SysLog message. Normalizing component 112 transmits the normalized data to analytics engine 113 of event data service 110. In some scenarios, normalizing component 112 detects that the event data received from receiving component 111 is in the appropriate format for transfer to analytics engine 113 and transfers the event data with no further processing.

Analytics engine 113 receives the normalized data from normalizing component 112 and context data from context data sources 130. Context data includes physical, logical, and external contextual information about a given device of devices 120. Analytics engine 113 integrates the context data with the normalized data to generate a complete dataset. In various implementations, analytics engine 113 configures the complete dataset for display in user interface 142 of computing device 140.

Upon generating a complete event dataset, analytics engine 113 processes the complete event dataset to identify anomalies, such as operational failures, performance issues, or cybersecurity events, associated with one or more of devices 120. In some implementations, to identify anomalies, analytics engine 113 may search the complete event dataset for known or recognized patterns of anomalies. In other scenarios, analytics engine 113 may use a trained AI model (not shown) to identify anomalies. The AI model may be trained to recognize anomalies using a supervised learning approach. The supervised learning approach employs training data based on identified normal behavior and anomalous behavior for an industrial automation device or process. The AI model, such a neural network or other deep learning model, is trained to learn patterns associated with normal and anomalous behavior. Subsequent to evaluating the performance of the AI model using testing data (i.e., data not used in training the model), the AI model is deployed to identify anomalies in the complete event dataset.

Continuing the exemplary scenario, when analytics engine 113 detects an anomaly in the complete event dataset, it identifies an action responsive to the particular type of anomaly and transmits a request to action component 114 to perform the action. For example, if analytics engine 113 detects a pattern of attempts to access a device by an unauthorized party, analytics engine 113 may identify the action corresponding to the anomaly to be disconnecting the subject device from network access. Analytics engine 113 transmits a request to action component 114 to initiate a network disconnect of the affected device. As another example, if analytics engine 113 detects an anomaly, analytics engine 113 may identify the action to put the industrial automation environment 100, including devices 120, into a safe state. A safe state may be the desired action, for example, if analytics engine 113 detects an unknown anomaly but cannot determine definitively that the industrial automation environment is uncompromised. The safe state may include any number of actions including disabling one or more devices 120, putting one or more devices 120 into a disconnected state, removing sources of energy (e.g., electricity, compressed air, or hydraulics), maintaining power to hold equipment in the safest state (e.g., an elevated position or holding position), and the like. Achieving a safe state may include several actions. For example, in discrete industry, the safe state may be where safety controls stop the motion of robots, conveyors, and other motorized equipment. Part of the stopping procedure may include moving the equipment into a home or parked position. Once stopped, the equipment may be electronically locked in place. For some equipment (e.g., devices 120) holding the equipment in the safest state may be where the controls are not deenergized, but rather the controls hold the equipment in a fixed position or continue motion at a fixed or reduced speed. In the process industry, the safe state may include turning off a heat source to a vessel, stopping a flow, or limiting a pressure.

Figure 2:
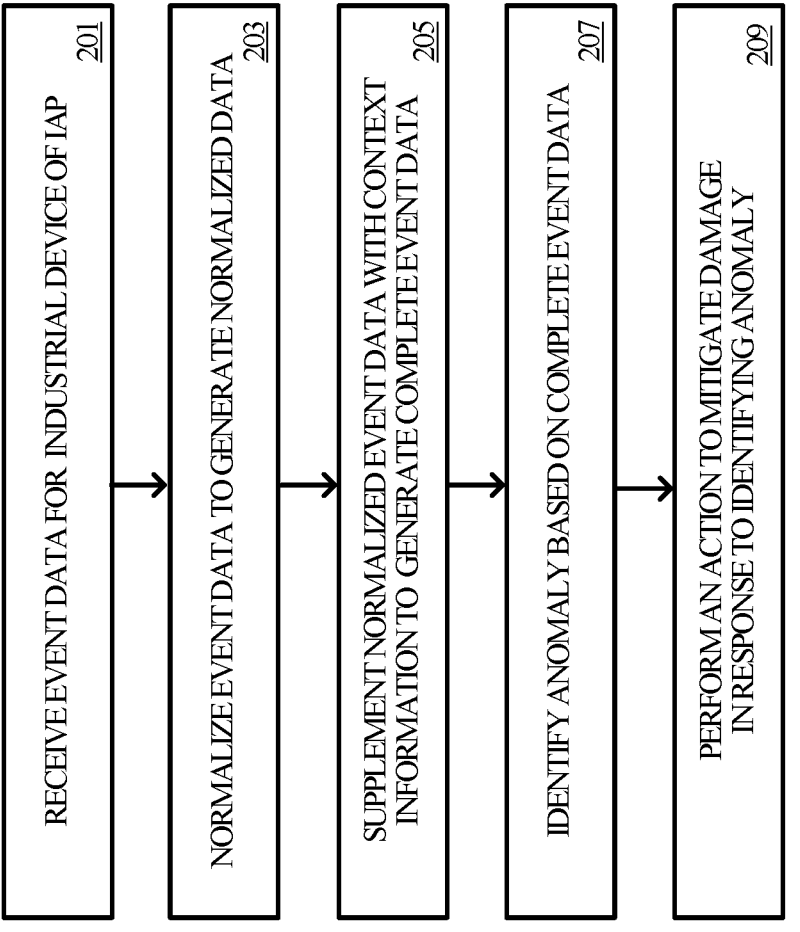
FIG. 2 illustrates a method for aggregating security event information in an implementation.

FIG. 2 illustrates process 200 for aggregating anomalous event data and providing a system response in an implementation. Process 200 may be implemented on one or more computing devices, such as server computers, according to program instructions which direct the computing devices to function as follows, referring parenthetically to the steps in FIG. 2 and in the singular for the sake of clarity.

In an industrial automation environment, industrial automation processes are performed by industrial automation devices. An event data service receives event data for an industrial device of an industrial automation process (step 201). In an implementation, the event data service receives the event data of the device via one or more of a network connection (e.g., an Ethernet connection) to an industrial controller which controls the device, a network connection to a power control module controlling power to the device, or a network connection the device itself. The event data relates to the operation of the device in the context of the industrial automation process. The event data may be collected by a PLC and transmitted to the event data service at regular intervals according to control logic or programming. Alternatively, it may be transmitted when the PLC detects a parameter of the event data exceeds a range or threshold of nominal activity. The event data may be transmitted in a SysLog format, a JSON data object, or other data format.

Upon receiving the event data for the industrial device, the event data service normalizes the data to generate normalized data (step 203). In an implementation, the normalized data includes event data converted to a standardized format for analysis by an analytics engine of the event data service. In some instances, to generate the standardized format, the event data service may receive event data in name-value pairs and map the values to corresponding fields of the normalized format. The normalized data may also be sent by the event data service to the user interface of a computing device in communication with the service for monitoring and control by a user, such as plant personnel. For example, the normalized data may be configured to display data values in tags. By transforming the event data into the normalized format, the user interface may be configured to receive and display the normalized data according to the tags. Normalizing the event data may also include computing standardized values of the data to facilitate comparison of comparable data across multiple proprietary systems for generating the data. In still other scenarios, normalizing the event data is a straightforward process of transferring the event data into a normalized dataset with no processing needed.

The event data service supplements context data pertaining to the industrial device to generate complete event data (step 205). In an implementation, with the event data rendered in a normalized form, the event data service receives context information pertaining to the industrial device (as well as to other industrial devices) and integrates the context information with the normalized data. For example, the event data service may integrate the context data with the normalized data according to a time at which the context data was recorded, thereby providing a more complete picture or context of the industrial automation process or environment at the time of the event giving rise to the event data. Notably, in some scenarios, the event data service integrates the context data prior to normalizing the event data to generate a complete data set based on both types of data.

The event data service may also configure the complete event data for presentation in a user interface of an event data application on a computing device in communication with the event data service. For example, the user interface may display a summary of complete event data according to the time of the event and/or the device affected by the event. A user may select an item corresponding to a complete event dataset and view details about the event, such as device data, event data, and integrated context information for the event.

Based on the complete event data, an analytics engine of the event data service identifies an anomaly in the complete event data (step 207). In an implementation, to identify an anomaly in the complete event data, the analytics engine may compare the complete event data to patterns of known anomalies. In some implementations, the analytics engine may employ a deep learning model trained in anomaly detection to identify any anomalies or possible anomalies. The anomalies detected by the analytics engine can include cybersecurity events, such as hackers attempting to penetrate the network which connects the various industrial devices of the industrial automation environment.

Having identified an anomaly from the complete event data, the analytics engine determines one or more actions to be taken in response to the anomaly, typically to neutralize the anomaly to prevent damage to the equipment, and in some scenarios, danger to plant personnel in the industrial automation environment, or even to other people and the community. Damage may include physical damage as well as intangible damage such as data exposure or damage to the security posture of the equipment in the industrial automation system. For example, an anomaly may require the affected device to be shut down or put into standby mode. The anomaly may also require that a notification be sent to computing devices which support monitoring and control operations, such as HMIs in the vicinity of the affected device.

In some implementations, the actions taken in response to anomalies are programmed in the user interface of the event data application operating on a user computing device. The user interface may, in some implementations, present a screen by which the user can select a type of anomaly and then select the one or more responses to be initiated or performed when the event data service (or analytics engine of the event data service) detects the anomaly.

Returning to FIG. 1, industrial automation environment 100 illustrates a brief example of process 200 as employed by elements of industrial automation environment 100 in an implementation.

Receiving component 111 of event data service 110 receives device data including event data from each of industrial devices 120. Device data may include data describing aspects of the operation of a respective device; event data may include data relating to a performance anomaly of the respective device detected by the device or by PLC 126 or by a PCM or IED controlling or connected to the device. In a brief and highly simplified illustration of the technology disclosed herein, device 124 may be a mixer in a food manufacturing process. Device 124 has a hopper which receives dry ingredients for mixing, including flour, sugar, and so on. Event data service 110 detects that the hopper has become clogged, which causes the manufacturing process to be halted so the hopper can be unclogged. Device 124 transmits the event data to event data service 110 in the form of a SysLog message including a timestamp, severity, device identifier, and process identifier. Normalizing component 112 of event data service 110 normalizes the event data to a standardized format and sends the normalized data to analytics engine 113.

Analytics engine 113 receives the normalized data and synthesizes complete event data or a complete event dataset by integrating context data received from one or more context data sources 130, such as a moisture-content sensor for the flour. Continuing the above exemplary scenario, analytics engine 113 receives context data relating to device 124 including the moisture content of the various dry ingredients including the flour. Analytics engine 113 determines that the operational anomaly of device 124 correlates to the moisture content of the flour. Analytics engine 113 determines that, based on the correlation, an action should be performed, such as introducing a policy to halt the operation of device 124 and its industrial automation process and sending a notification to computing device 140 for display in user interface 142 when a high moisture content of the flour is detected. Analytics engine 113 sends a request to action component 114 to perform the actions. Analytics engine 113 may further determine that the moisture-content issue is isolated to a particular storage facility, indicating a possible issue with regulating the environment of the facility and sends an alert to user interface 142 regarding the anomaly.

To identify an anomaly, analytics engine 113 may compare the complete event data to patterns of data associated with known anomalies. Analytics engine 113 may also send the complete event to event data model, such as a machine-learning or neural net model, trained on normal and anomalous event data, which detects a pattern in the anomalous operation of the industrial device and correlates an associated pattern in moisture-content of a raw material handled or processed by the device.

In another illustrative scenario, event data service 110 collects and analyzes operational data from PLC 126. Event data service 110 detects an unusual pattern in the data from PLC 126—that PLC 126 is receiving unusual commands from an external source. Analytics engine 113 determines that PLC 126 may have been compromised by a cybersecurity attack. Analytics engine 113 further determines that in the event of a suspected cybersecurity attack on a PLC, the targeted PLC should be isolated from the network of industrial automation environment 100. Other actions may include a policy change regarding the use cybersecurity measures such as implementing more secure access controls or more restrictive communication policies.

FIG. 3 illustrates user interface 300 of an event data application executing on a user computing device in communication with an event data service in an implementation. User interface 300, of which user interface 142 of FIG. 1 is representative, includes device selection menu 301, event information pane 303, and event context information pane 305. User interface 300 populates the various panes according to complete event data received from an event data service, of which event data service 110 is representative.

In operation, a user at a computing device displaying user interface 300 may select a device from device selection menu 301 to examine event data for that device. In various implementations, device selection menu 301 may be organized in a hierarchical structure corresponding to an asset model of the industrial automation process or environment. The menu items may be graphical drop-down menus by which a user can navigate to a particular industrial device.

In a brief example illustrated in FIG. 3, industrial device "1769-AENTR" has been selected in device selection menu 301, causing event information and event context information to be displayed in the respective panes. Event information pane 303 displays a history of recent events associated with the selected device along with the date and time the event was detected and the action, if any, taken in response. The action taken in response may be an action configured when the device was added to the event data service.

Continuing the brief example, a user selects an Overpressure event for device 1769-AENTR, which causes sone or all of the elements of the complete event data to be displayed event context information pane 305. Event context information pane 305 includes elements relating to the physical, logical and external context of the device, such as the location of the device, the controller associated with the device, other devices in authorized communication with the device, and production information such as production identifier, a batch identifier, and the raw material being handled or processed by the device.

Figure 4:
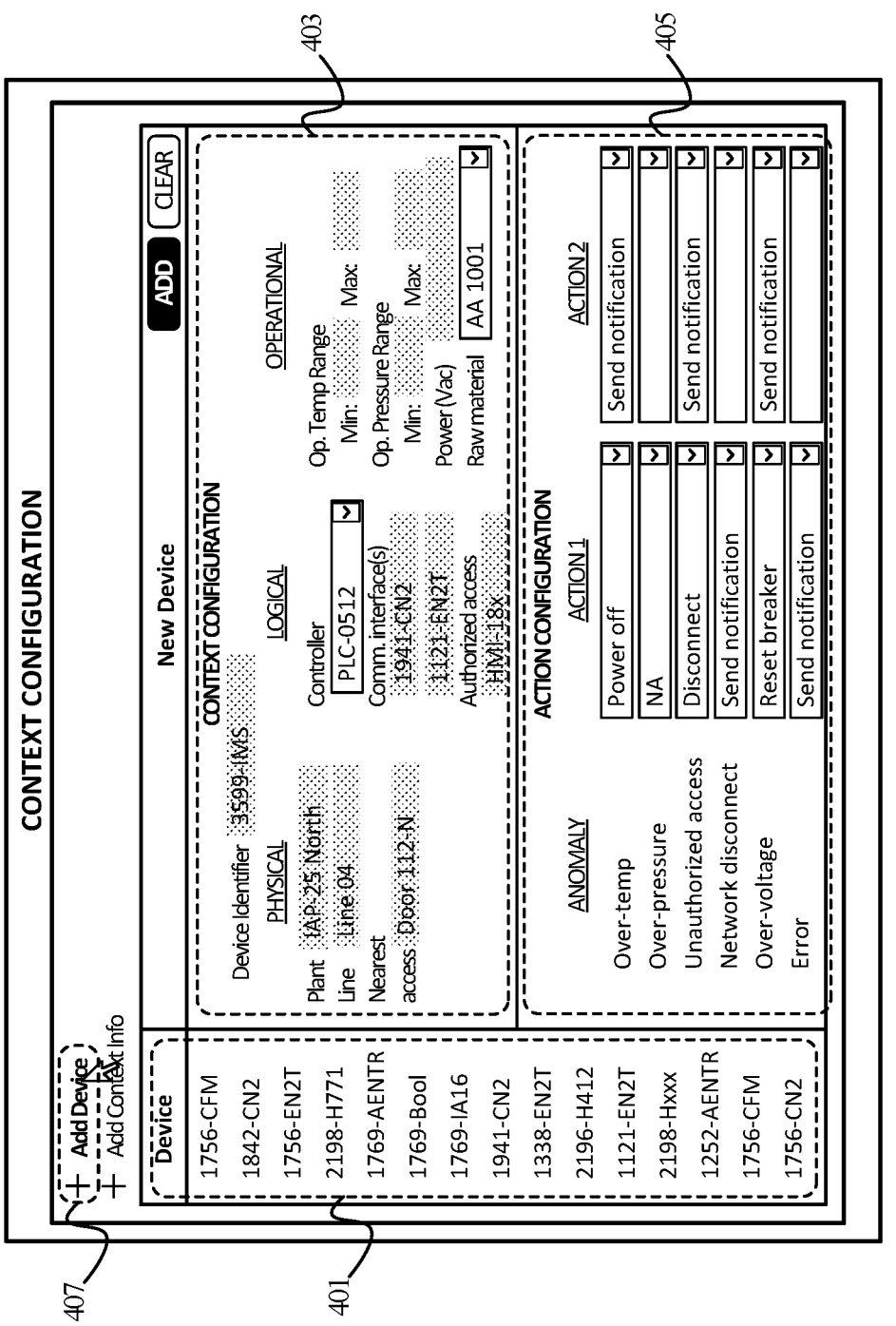
FIG. 4 illustrates a user interface for an event data aggregation system for an industrial automation environment in an implementation.

FIG. 4 illustrates user interface 400 of an event data application executing on a user computing device in communication with an event data service in an implementation. User interface 400, of which user interface 142 of FIG. 1 is representative, includes device selection menu 401, context configuration pane 403, action configuration pane 405, and add-device link 407. User interface 400 receives user input in the various panes and transmits the inputs to event data service, of which event data service 110 is representative. User interface 400 may also receive device data from the event data service by which to populate aspects of user interface 400, such as referring to an asset model of the industrial environment to configure drop-down menus.

In operation, a user at computing device displaying user interface 400 may add configure the event data service for a new device or update event data service information for an existing device. In user interface 400, the user can select add-device link 407 to add an industrial device to the event data service. Selecting add-device link 407 causes the event data application to display context configuration pane 403 and action configuration pane 405 in which the user can configure the industrial device for the event data service. Selecting a device in device selection menu 401 causes the event data application to display the current event data profile for the device in context configuration pane 403 and action configuration pane 405 where the user can modify or update the information.

In a brief example illustrated in FIG. 4, the user elects to add a new industrial device, "3599-IMS" which is entered in context configuration pane 403. In context configuration pane 403, the user enters information relating to the physical, logical, and operational context of the device. For example, the physical context may include information relating to the physical location of the device and access to it, such as the device location and associated process or production line as well as points of access to the device, such as secured entryways. The logical context may include other devices coupled to the subject device, such as a controller, HMI, or other control-plane devices, and other industrial devices which interface with the subject device. The logical context may populate drop-down menus according to an asset model which presents the user with identifies various industrial devices and equipment which interface with the device for control or in operation. The operational context receives operational parameters for the new device by which anomalous behavior may be identified, such as exceeding a temperature range or pressure range. The operational context also may also include information relating to the raw material processed or handled by the device.

In action configuration pane 405, the user configures actions to be taken with respect to the new device when an anomalous event is detected according to the type of anomaly. Actions can include disconnecting the device from network access when a cybersecurity event is detected or shutting down the device when an operational anomaly is detected. Actions may also include putting the industrial automation system into a safe state, for example when an unknown anomaly is detected and the state of the industrial automation system cannot be determined to be uncompromised. Actions can also include sending a notification to any of various computing devices in communication with the event data service.

Turning now to FIG. 5, architecture 500 illustrates computing device 501 that is representative of any system or collection of systems in which the various processes, programs, services, and scenarios disclosed herein may be implemented. Examples of computing device 501 include, but are not limited to, server computers, web servers, cloud computing platforms, and data center equipment, as well as any other type of physical or virtual server machine, container, and any variation or combination thereof. Examples also include desktop and laptop computers, tablet computers, mobile computers, and wearable devices.

Computing device 501 may be implemented as a single apparatus, system, or device or may be implemented in a distributed manner as multiple apparatuses, systems, or devices. Computing device 501 includes, but is not limited to, processing system 502, storage system 503, software 505, communication interface system 507, and user interface system 509 (optional). Processing system 502 is operatively coupled with storage system 503, communication interface system 507, and user interface system 509.

Processing system 502 loads and executes software 505 from storage system 503. Software 505 includes and implements event data process 506, which is representative of the event data processes discussed with respect to the preceding Figures, such as process 200. When executed by processing system 502, software 505 directs processing system 502 to operate as described herein for at least the various processes, operational scenarios, and sequences discussed in the foregoing implementations. Computing device 501 may optionally include additional devices, features, or functionality not discussed for purposes of brevity.

Referring still to FIG. 5, processing system 502 may comprise a micro-processor and other circuitry that retrieves and executes software 505 from storage system 503. Processing system 502 may be implemented within a single processing device but may also be distributed across multiple processing devices or sub-systems that cooperate in executing program instructions. Examples of processing system 502 include general purpose central processing units, graphical processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device but may also be implemented across multiple storage devices or sub-systems co-located or distributed relative to each other. Storage system 503 may comprise additional elements, such as a controller, capable of communicating with processing system 502 or possibly other systems.

Software 505 (including event process 506) may be implemented in program instructions and among other functions may, when executed by processing system 502, direct processing system 502 to operate as described with respect to the various operational scenarios, sequences, and processes illustrated herein. For example, software 505 may include program instructions for implementing the event data processes as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software, virtualization software, or other application software. Software 505 may also comprise firmware or some other form of machine-readable processing instructions executable by processing system 502.

In general, software 505 may, when loaded into processing system 502 and executed, transform a suitable apparatus, system, or device (of which computing device 501 is representative) overall from a general-purpose computing system into a special-purpose computing system customized to support event data processing. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary, etc.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 507 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 501 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware implementation, an entirely software implementation (including firmware, resident software, micro-code, etc.) or an implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the disclosure. Those skilled in the art will also appreciate that the features described above may be combined in various ways to form multiple implementations. As a result, the invention is not limited to the specific implementations described above, but only by the claims and their equivalents.

Unless the context clearly requires otherwise, throughout the description and the claims, the words "comprise," "comprising," "such as," and "the like" are to be construed in an inclusive sense, as opposed to an exclusive or exhaustive sense, that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having operations, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

19

What is claimed is:

1. A method, comprising:

receiving, in a user interface of an industrial automation application, a configuration for a response to an anomaly type on an industrial automation device, wherein:

the configuration comprises context information of the industrial automation device and action information of the industrial automation device, the context information comprises operational parameters for identifying the anomaly type on the industrial automation device, and the action information comprises one or more physical actions to be performed on the industrial automation device in response to detecting the anomaly type in complete event data of the industrial automation device;

receiving, from a plurality of industrial automation devices including the industrial automation device, event data describing one or more events that occurred on an associated industrial automation device of the plurality of industrial automation devices, wherein the plurality of industrial automation devices are performing industrial automation processes in an industrial automation environment;

for each of the one or more events:

normalizing the event data describing a respective event to generate normalized event data describing the respective event that occurred on the associated industrial automation device, and supplementing the normalized event data with the context information relevant to the associated industrial automation device for the respective event to generate the complete event data for the respective event for the associated industrial automation device;

identifying the anomaly type for the industrial automation device of the plurality of industrial automation devices based on analyzing the complete event data associated with the industrial automation device; and in response to the identifying the anomaly type for the industrial automation device, performing the one or more physical actions on the industrial automation device to mitigate damage based on the action information and the context information in the configuration of the industrial automation device.

2. The method of claim 1, wherein the operational parameters comprise, for the industrial automation device, a temperature, a current draw, a vibration rate, a torque value, a rotational speed, a flow rate, or a combination thereof.

3. The method of claim 1, wherein the context information comprises data describing a logical hierarchy of the plurality of industrial automation devices based on an asset model of the industrial automation environment.

4. The method of claim 1, wherein the context information comprises data describing a physical location of each of the plurality of industrial automation devices.

5. The method of claim 1, wherein the context information comprises data describing raw materials of an industrial automation process used by the associated industrial automation device.

6. The method of claim 1, wherein the context information comprises data describing batch information for the associated industrial automation device performing an industrial automation process at a time of the respective event of the one or more events.

7. The method of claim 1, wherein the context information comprises data describing authorized communications between devices in the industrial automation environment.

8. The method of claim 1, wherein the context information comprises physical proximity information of a user.

9. The method of claim 1, wherein the analyzing the complete event data comprises applying one or more machine learning models to the complete event data to identify the anomaly type.

10. The method of claim 1, further comprising:

configuring the one or more physical actions based on user input.

11. The method of claim 1, wherein the one or more physical actions comprise automatically shutting down the industrial automation device.

12. The method of claim 1, wherein the one or more physical actions comprise automatically modifying a mode of the industrial automation device to a disconnected mode.

13. The method of claim 1, wherein the one or more physical actions comprise automatically reconfiguring a policy of the industrial automation device, wherein the policy comprises at least one of an access policy and a communication policy.

14. The method of claim 1, further comprising:

receiving the context information from a plurality of context sources; and updating the context information as it is received.

15. The method of claim 1, further comprising:

providing the user interface, the user interface comprising:

a view of the complete event data; and user interface components that allow a user to navigate and drill into the complete event data.

16. The method of claim 15, wherein the user interface further comprises the user interface components that allow the user to configure settings, wherein the settings comprise one or more of notification settings and action settings.

17. The method of claim 1, wherein the damage comprises physical damage to the industrial automation device, loss of communication to the industrial automation device, reprogramming of the industrial automation device, production rate losses, proprietary information leakage, product quality loss to products created by an industrial automation process, efficiency losses, or a combination thereof.

18. A system, comprising:

one or more processors; and a memory having stored thereon instructions that, upon execution by the one or more processors, cause the one or more processors to:

receive, in a user interface of an industrial automation application, a configuration for a response to an anomaly type on an industrial automation device, wherein:

the configuration comprises context information of the industrial automation device and action information of the industrial automation device, the context information comprises operational parameters for identifying the anomaly type on the industrial automation device, and the action information comprises one or more physical actions to be performed on the industrial automation device in response to detecting the anomaly type in complete event data of the industrial automation device;

receive, from a plurality of industrial automation devices including the industrial automation device, event data describing one or more cybersecurity events that occurred on an associated industrial automation device of the plurality of industrial automation devices, wherein the plurality of industrial automation devices are performing industrial automation processes in an industrial automation environment;

for each of the one or more cybersecurity events:
    normalize the event data describing a respective cybersecurity event to generate normalized event data describing the respective cybersecurity event that occurred on the associated industrial automation device, and
    supplement the normalized event data with the context information relevant to the associated industrial automation device for the respective cybersecurity event to generate the complete event data for the respective cybersecurity event for the associated industrial automation device;

identify the anomaly type for the industrial automation device of the plurality of industrial automation devices based on analyzing the complete event data associated with the industrial automation device; and in response to the identifying the anomaly type for the industrial automation device, perform the one or more physical actions on the industrial automation device to mitigate damage based on the action information and the context information in the configuration.

19. The system of claim 18, wherein the context information comprises data describing a logical hierarchy of the plurality of industrial automation devices based on an asset model of the industrial automation environment, data describing a physical location of each of the plurality of industrial automation devices, data describing raw materials of an industrial automation process used by the associated industrial automation device, data describing batch information for the associated industrial automation device performing the industrial automation process at a time of the respective cybersecurity event of the one or more cybersecurity events, data describing authorized communications between devices in the industrial automation environment, physical proximity information of a user, or a combination thereof.

20. The system of claim 18, wherein the one or more physical actions comprise one or more of:
    automatically shutting down the industrial automation device, modifying a mode of the industrial automation device to a disconnected mode, automatically reconfiguring a policy of the industrial automation device, wherein the policy comprises at least one of an access policy and a communication policy, and automatically modifying a state of an industrial automation system comprising the plurality of industrial automation devices to a safe state.

\* \* \* \* \*